US007021937B2

(12) United States Patent
Simpson et al.

(10) Patent No.: US 7,021,937 B2
(45) Date of Patent: Apr. 4, 2006

(54) RACE CAR SIMULATOR

(75) Inventors: Barry Simpson, Irvine, CA (US); William R. Bohn, Granada Hills, CA (US)

(73) Assignee: Viretek, Newport Beach, CA (US)

(*) Notice: Subject to any disclaimer, the term of this patent is extended or adjusted under 35 U.S.C. 154(b) by 788 days.

(21) Appl. No.: 09/835,830

(22) Filed: Apr. 16, 2001

(65) Prior Publication Data

US 2002/0032553 A1 Mar. 14, 2002

Related U.S. Application Data

(60) Provisional application No. 60/197,832, filed on Apr. 14, 2000.

(51) Int. Cl.
*G09B 19/16* (2006.01)

(52) U.S. Cl. .......................................... 434/62; 434/69

(58) Field of Classification Search .................. 434/29, 434/38, 40, 43, 44, 48, 61, 62, 69; 472/130
See application file for complete search history.

(56) References Cited

U.S. PATENT DOCUMENTS

| | | | | |
|---|---|---|---|---|
| 3,348,897 | A | 10/1967 | Hourdiaux | |
| 3,784,742 | A | 1/1974 | Burnham et al. | |
| 4,022,522 | A | 5/1977 | Rain | |
| 4,164,080 | A * | 8/1979 | Kosydar et al. | 434/38 |
| 4,299,446 | A | 11/1981 | Jenkins, Jr. | |
| 4,714,428 | A * | 12/1987 | Bunker et al. | 434/43 |
| 4,750,808 | A | 6/1988 | Nash et al. | |
| 4,753,596 | A * | 6/1988 | Hart et al. | 434/29 |
| 5,112,121 | A | 5/1992 | Chang et al. | |
| 5,137,348 | A * | 8/1992 | Lacroix | 353/79 |
| 5,200,854 | A | 4/1993 | Ogino et al. | |
| 5,226,816 | A * | 7/1993 | Hawkins | 434/38 |
| 5,477,394 | A | 12/1995 | Shibazaki | |
| 5,507,647 | A * | 4/1996 | Morris | 434/55 |
| 5,521,658 | A | 5/1996 | Donohoe | |
| 5,782,639 | A * | 7/1998 | Beal | 434/29 |
| 5,833,340 | A | 11/1998 | Yoshikawa et al. | |
| 5,865,624 | A * | 2/1999 | Hayashigawa | 434/66 |
| 6,079,982 | A * | 6/2000 | Meader | 434/29 |
| 6,152,828 | A * | 11/2000 | Tomita et al. | 472/60 |
| 6,171,186 | B1 * | 1/2001 | Kurosawa et al. | 463/31 |
| 6,190,172 | B1 * | 2/2001 | Lechner | 434/44 |
| 6,270,350 | B1 * | 8/2001 | Christopher | 434/69 |
| 6,354,044 | B1 * | 3/2002 | Lagace, Jr. | 52/79.5 |
| 6,354,838 | B1 * | 3/2002 | Tagge et al. | 434/62 |
| 6,409,351 | B1 * | 6/2002 | Ligon | 353/98 |
| 6,431,872 | B1 * | 8/2002 | Shiraishi et al. | 434/69 |
| 6,513,512 | B1 * | 2/2003 | Battersby et al. | 124/78 |

* cited by examiner

*Primary Examiner*—Kurt Fernstrom
(74) *Attorney, Agent, or Firm*—Knobbe, Martens, Olson & Bear, LLP

(57) ABSTRACT

The cockpit and external appearance of a racing car are accurately simulated. A spherical mirror display is attached to the underside of the hood of the simulator. When the hood is raised, a video presentation is projected onto a display screen via first and second mirrors and the image on the display screen is reflected off of the spherical mirror to the player "driving" the simulated racing car. In the preferred embodiment, the spherical mirror is a thin acrylic sheet molded to the desired curvature. A mirror surface is formed on the concave surface of the molded sheet and a sheet of foam plastic is scored on one side so that the foam plastic sheet conforms to the reverse concave side of the molded acrylic sheet. The foam sheet is molded to the thin acrylic sheet mirror to rigidly support the acrylic sheet mirror in the desired curvature.

8 Claims, 17 Drawing Sheets

RACE CAR SIMULATOR

PRIORITY CLAIM

This application claims the benefit of U.S. Provisional Application No. 60/197,832 filed Apr. 14, 2000.

FIELD OF THE INVENTION

This invention relates to improvements in providing extraordinary realism for race car simulators:

SUMMARY OF THE INVENTION

The present invention relates to a cockpit providing a display system and user interface for an interactive computer system. A feature of the preferred embodiment of the invention is that all of the components of a virtual reality system are incorporated within a simulated race car.

In the preferred embodiments of the present invention, the cockpit has a space efficient arrangement of all components, including, but not limited to, optics, dimensional sound, a large display, and seating. This arrangement is desirable because the virtual experience is greatly enhanced by entering into and sitting in a vehicle that looks and feels and sounds substantially like an actual race car. This arrangement is moreover advantageous because it provides a cockpit having a reduced footprint, that is, it reduces the square footage occupied by the simulator so that the "real estate" occupied by each such car can be minimized, making the simulator more attractive to install in entertainment facilities.

DETAILED DESCRIPTION OF THE PREFERRED EMBODIMENT

Figure 1:
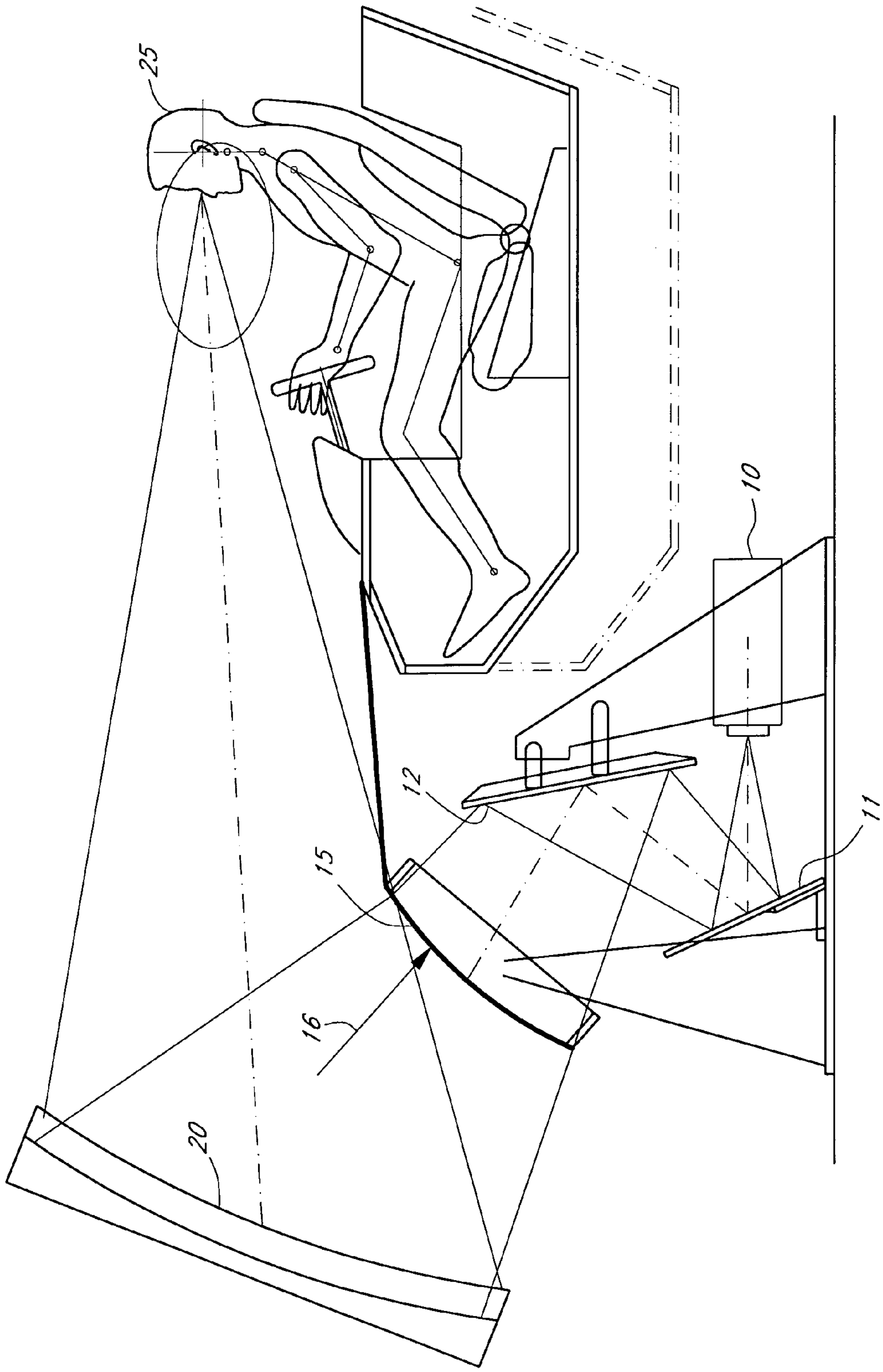
FIG. 1 is a schematic illustration of the overall of one embodiment of the virtual reality simulator of this invention.

Referring now to FIG. 1, a computer/video projector 10 projects onto a first mirror 11. The reflected video image from mirror 11 is reflected by a second mirror 12 onto a diffusing rear projection screen 15. A collimated image of the video presentations on screen 15 is provided to the viewer 25 by a concave or spherical mirror 20.

Figure 2:
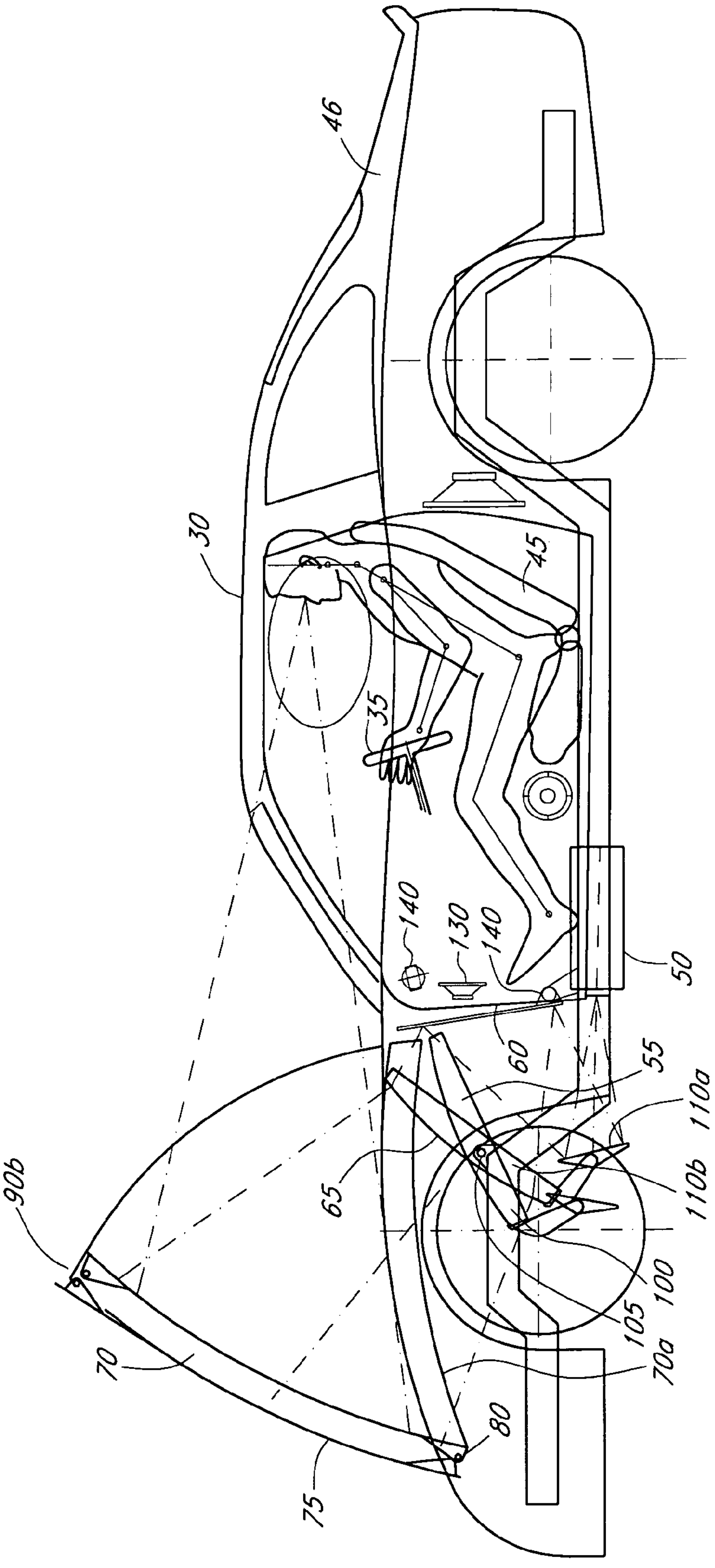
FIG. 2 is a schematic view of a race car simulator constructed in accordance with the preferred embodiment of this invention.

A significant feature of the preferred embodiments of this invention is that it enables an amazingly realistic virtual simulator system to be entirely installed within a simulated automobile chassis as shown in the drawing of FIG. 2. Advantageously, the construction of the simulator 30 is similar to that of an actual racing car such as used in NASCAR races so that the user's virtual reality experience is enhanced by the external and internal appearance of the simulator 30. Thus, the simulator includes a chassis made from steel tubes and automobile cockpit advantageously includes a lightweight tube frame similar to or even exactly like the roll cage used in the actual race car. The body 46 is advantageously formed from fiber reinforced plastic with lexan windows and shaped to further enhance the realistic "look" of a race car. Further, the steering wheel 35, shifter and foot pedals 40 advantageously have a realistic look and feel and, as described below, advantageously control an interactive computer system. The seats 45 advantageously are adjustable to put these controls within reach of both children and adults.

In the preferred embodiment, shown in FIGS. 2, 3, and 4, the computer/video projector 50 is mounted below or partially below the floor board of the cockpit and projects the display image to a first mirror 55. The image is then reflected via a second mirror 60 to the rear projection screen 65. The viewer 25 (or viewers 25*a*, 25*b*) view the image as reflected off a spherical mirror 70.

To further enhance the realism of the simulated race car experience and to further facilitate the mobility of the complete simulator, all of the projection and viewing apparatus is advantageously self-contained within the simulator 30. In the preferred embodiments, spherical mirror 70 is attached to the bottom of the simulator hood 75 and articulates around the hood axis 80. As shown in FIG. 2, hood 75 may be closed, as shown at 90*a*, to give the simulator the same appearance as an actual race car, or raised, as shown at 90*b*, when the viewer or viewers are seated and the simulated race is to take place.

In order that the hood 75 may close entirely, the first mirror 55 and rear projection screen 65 are mounted to a generally L-shaped support 100 that rotates around axis 105. Thus, when the hood 75 is closed at position 90*a*, the mirror 55 and screen 65 have articulated to the enclosed position shown at 110*a*. When the hood is raised to position 90*b*, the first mirror 55 and transmission screen 65 articulate to the position shown at 110*b* suitable for projecting the image into the spherical mirror 70.

Figure 3:
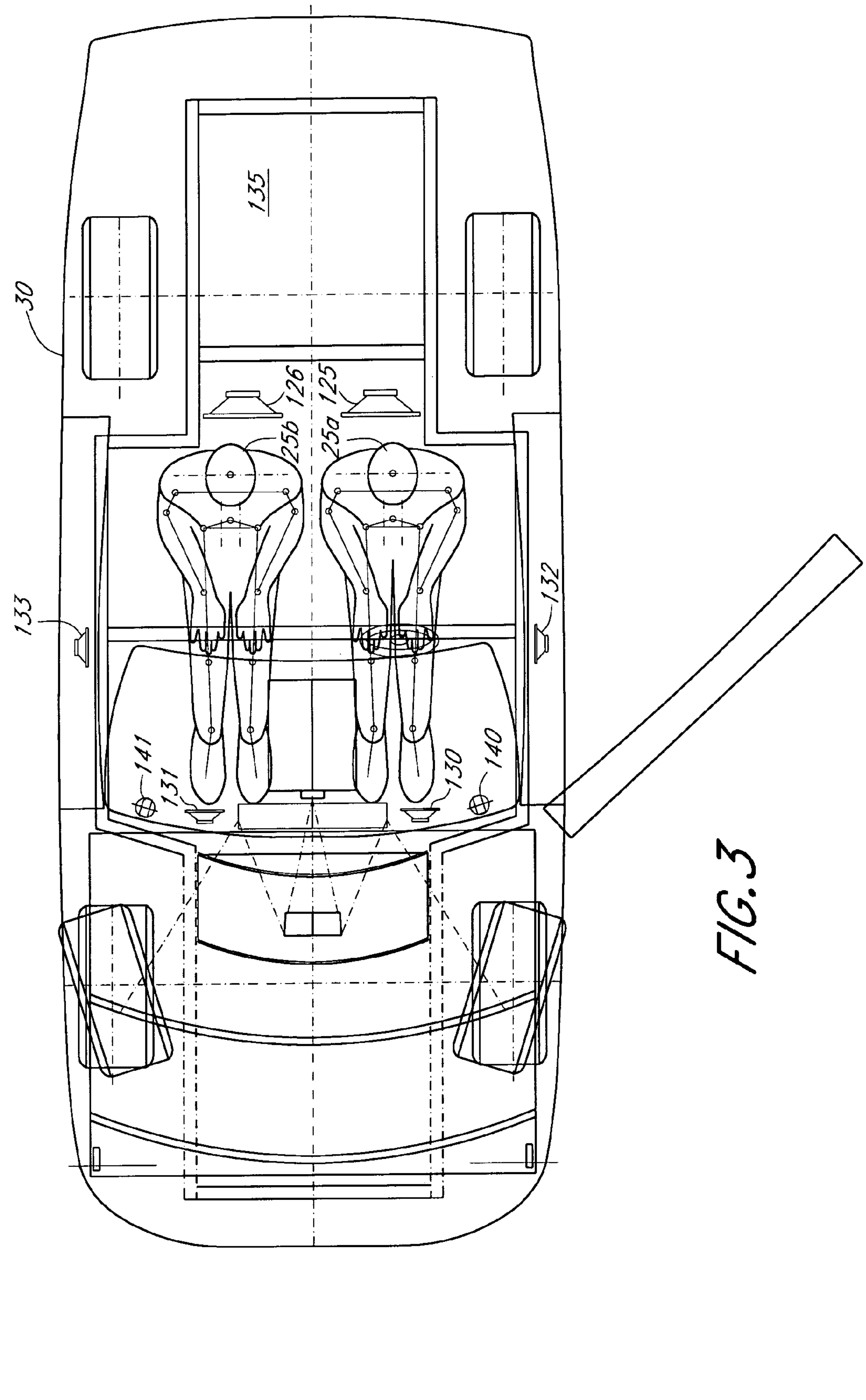
FIG. 3 is a schematic top plan view of the race car simulator of FIG. 2.
Figure 18:
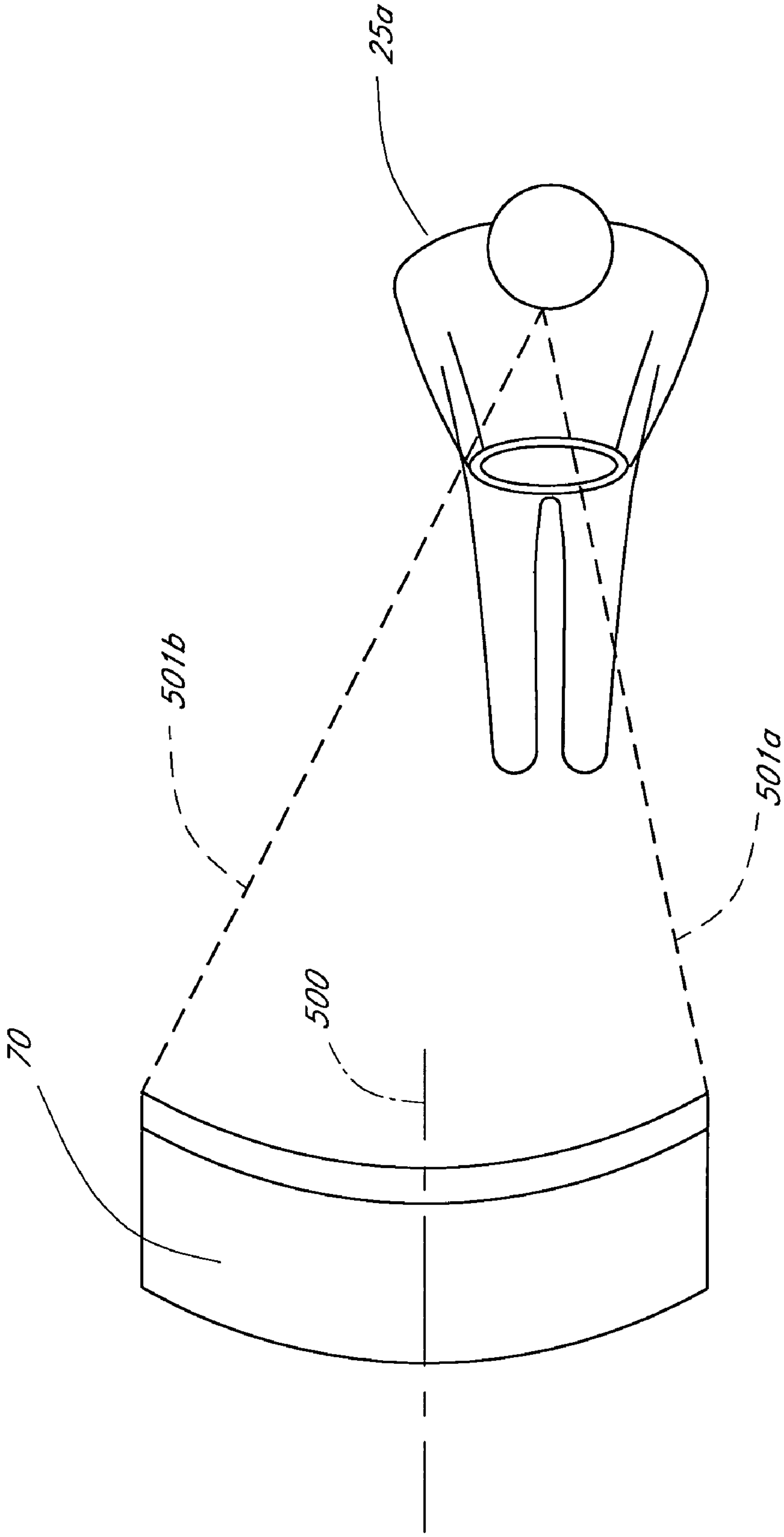
FIG. 18 illustrates the preferred mounting of the spherical mirror in relation to the seating position of the player of the race car simulator.

In the preferred embodiment, the radius of curvature of the spherical display mirror is aligned with the player or driver of the vehicle (shown in FIG. 3 as viewer 25*a*). Referring to FIG. 18, this driver 25*a* is shown sitting in the left hand seat of the simulator looking ahead at the spherical mirror 70. The mirror 70 is slightly tilted on the axis 500 so that the radii 501*a* and 501*b* terminating at the eyes of the viewer 25*a* are substantially identical in length. Further, as shown in FIGS. 1 and 2, in the preferred embodiment, the center of the radius of curvature of the spherical display mirror is located below the eyes of the viewers. A feature of this configuration is that combination of the closed roof of the vehicle and downward angle of the spherical mirror substantially shields from ambient light the virtual display seen by the viewer as reflected by the spherical mirror. As a result, the simulator may be used in a fully lit room or outdoor environment.

To further enhance the realism of the simulator experience, the preferred embodiment includes, as shown in FIG. 3, a speaker system including large loud speakers 125, 126 mounted at the rear of the simulator 30 in back of the viewers 25*a*, 25*b* and tweeter speakers 130, 131 mounted in front of the viewers and two or more side speakers 132, 133. Such a system provides three-dimensional (3D) sound. Quadraphonic sound is advantageously balanced to enhance the three-dimensional (3D) localization to each of the users 25*a*, 25*b*. Advantageously, the speakers 125, 126, 130, 131, 132 and 133 are contained entirely within the cockpit housing so as to not penetrate the housing or increase the cockpit footprint.

The simulated race configuration of the simulator 30 includes a large area in the trunk 135 which is advantageously used to house the computer coupled to the steering wheel and controls for providing the interactive simulation experience.

The simulated experience provided by this invention simulates extremely well the real-life handling of a NASCAR race car, so much in fact that it is desirable to reduce the opportunity for motion sickness. Accordingly, one embodiment of the invention includes a forced-air ventilation system which, during the simulated race, provides a flow of air through air vents 140, 141 onto the faces of the participants 25*a*, 25*b*.

Figure 5:
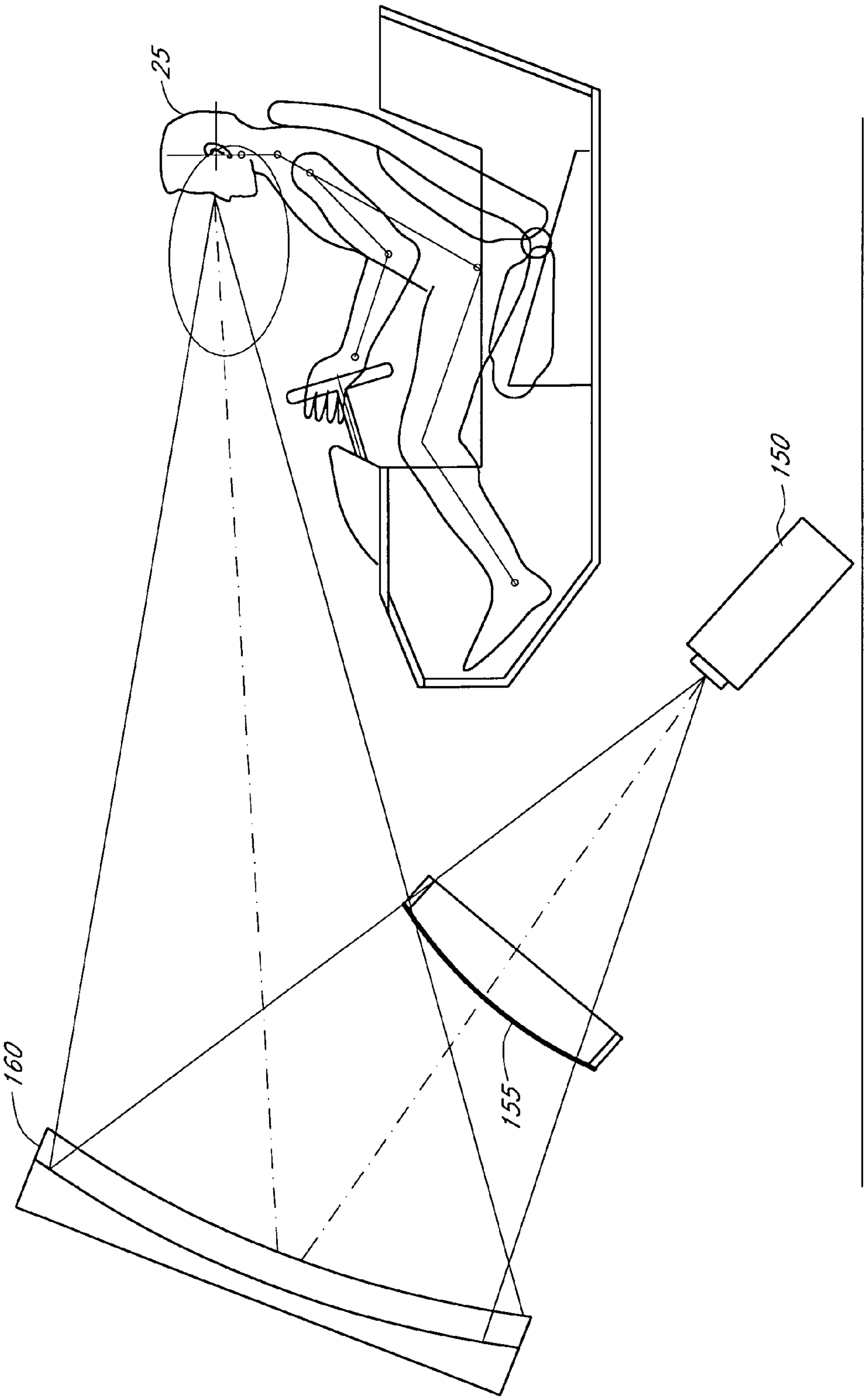
FIG. 5 is a schematic illustration of the overall system of another embodiment of the virtual reality simulator of this invention.

Another embodiment of the invention is shown in the schematic drawing of FIG. 5. In this example, the video projector 150 is moved further back and further below within the simulator. The image projected from projector 150 is shown directly on the back of the rear projection screen 155 and observed by the viewer 25 as reflected off the concave or spherical mirror 160.

Figure 6:
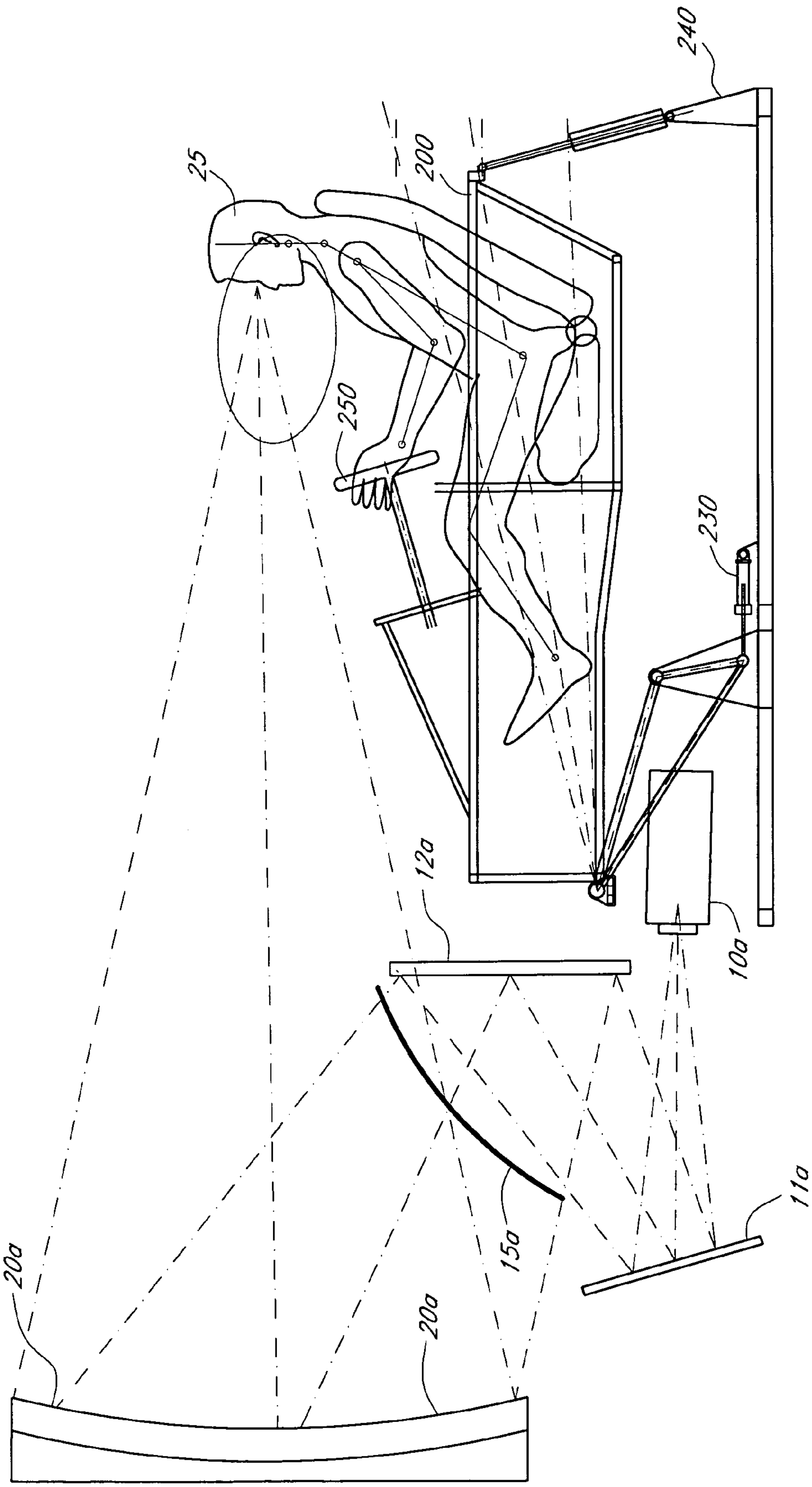
FIG. 6 is a schematic illustration of another embodiment of the invention that includes an actuator for imparting motion to the cockpit.
Figure 7:
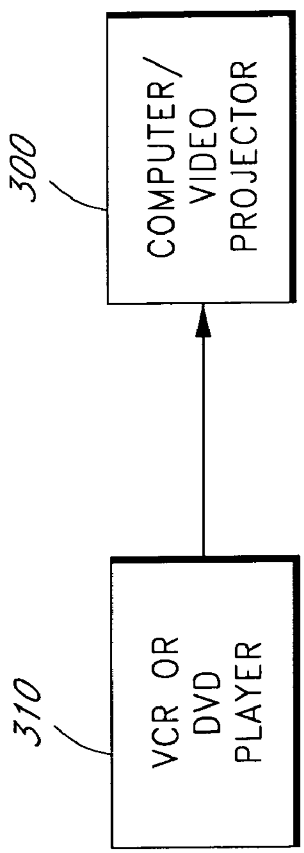
FIG. 7 is a block diagram of one embodiment of the invention.

FIG. 6 illustrates schematically an additional embodiment of the invention in which the video projector 10*a*, first mirror 11*a*, second mirror 12*a*, projection screen 15*a* and concave or spherical mirror 20*a* and mounted to a stationary platform whereas the cockpit 200 of the simulated race car is mounted on a movable actuator and shock absorber 230, 240 such that the cockpit is caused to move in response to the interactive controls provided by the steering wheel and hand and foot controls included within the cockpit area and operable by the participating operator 25.

A feature of this invention is that it is adapted to many forms of virtual entertainment and training. Thus, in one simple version, the projector 300 is connected to a VCR or DVD or laser disc player 310 and to replay on the projector the video recording of an actual race taken by a video camera mounted on the actual race car.

Figure 8:
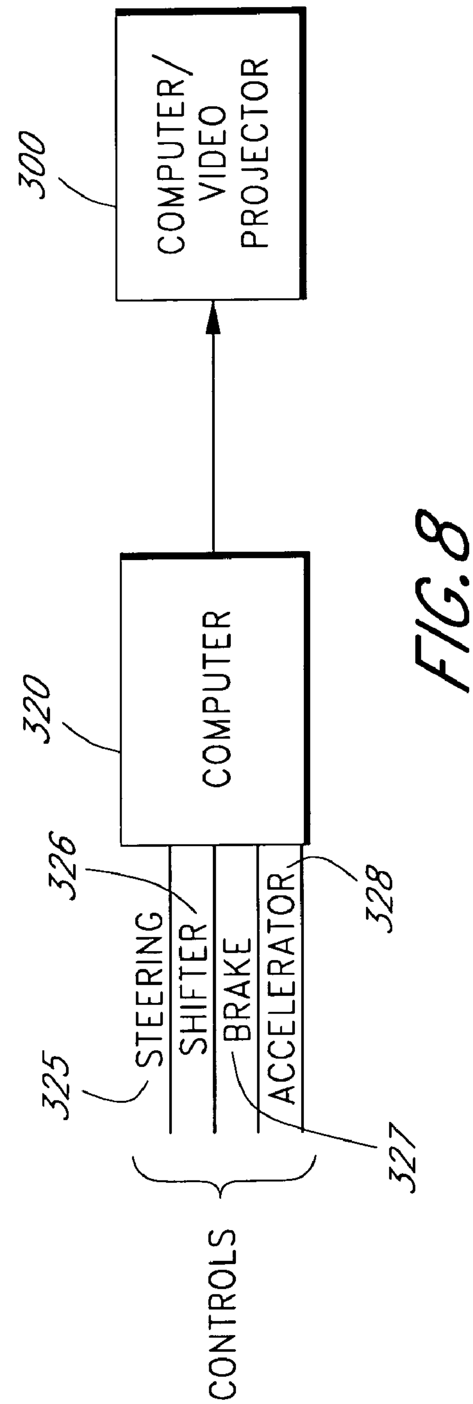
FIG. 8 is a block diagram of another embodiment of the invention.

In the embodiment of FIG. 8, an interactive virtual reality program is stored, for example on the hard disc or other suitable broadband storage media of computer 320 which has a one or more inputs 325, 326, 327, 328, respectively, connected to, for example, the steering wheel, shifter, brake and accelerator of the race car simulator described above to give the operator substantial control over the virtual experience and thus simulate an extremely realistic virtual experience.

Figure 4:
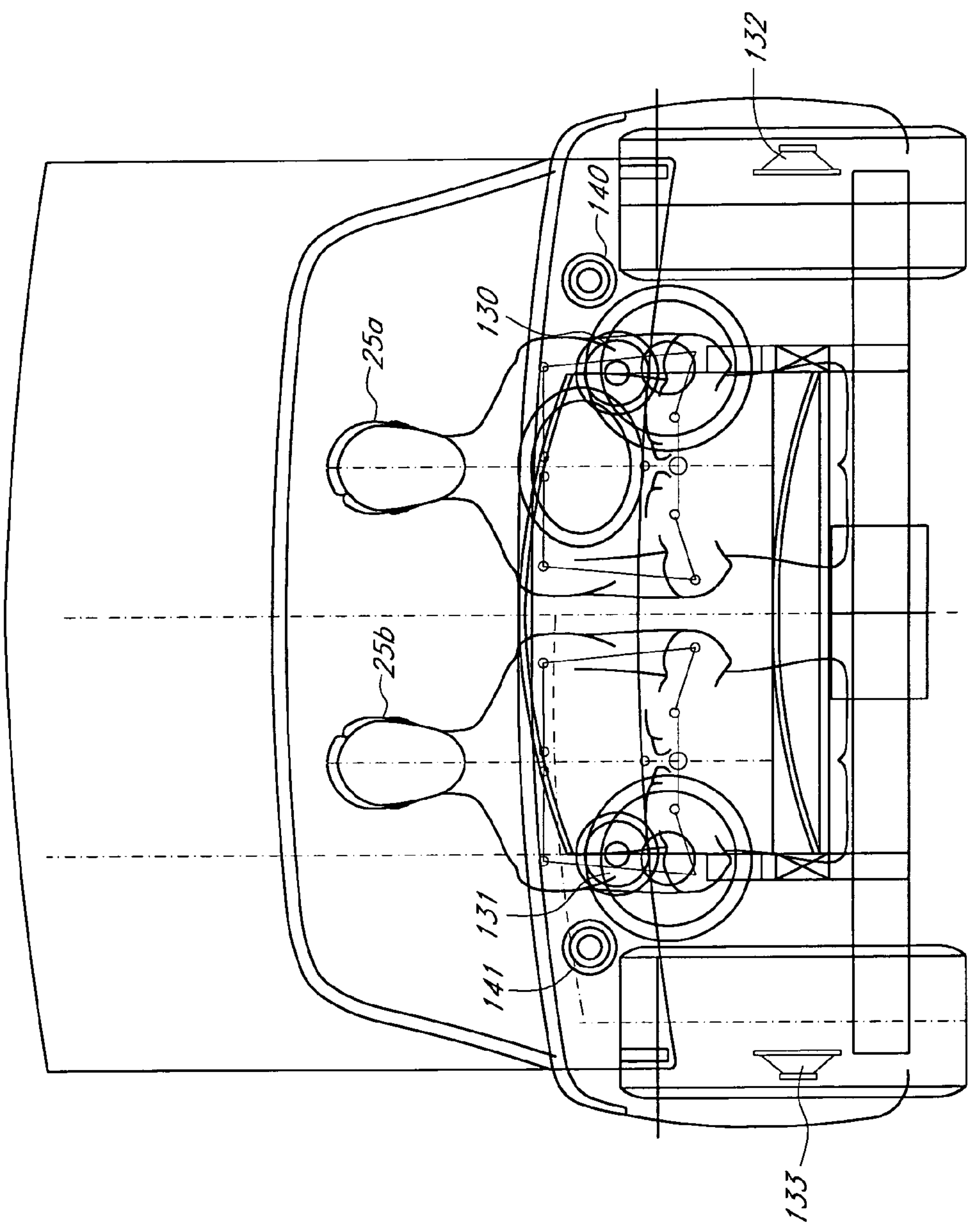
FIG. 4 is a schematic front side view of the race car simulator of FIG. 2.
Figure 9:
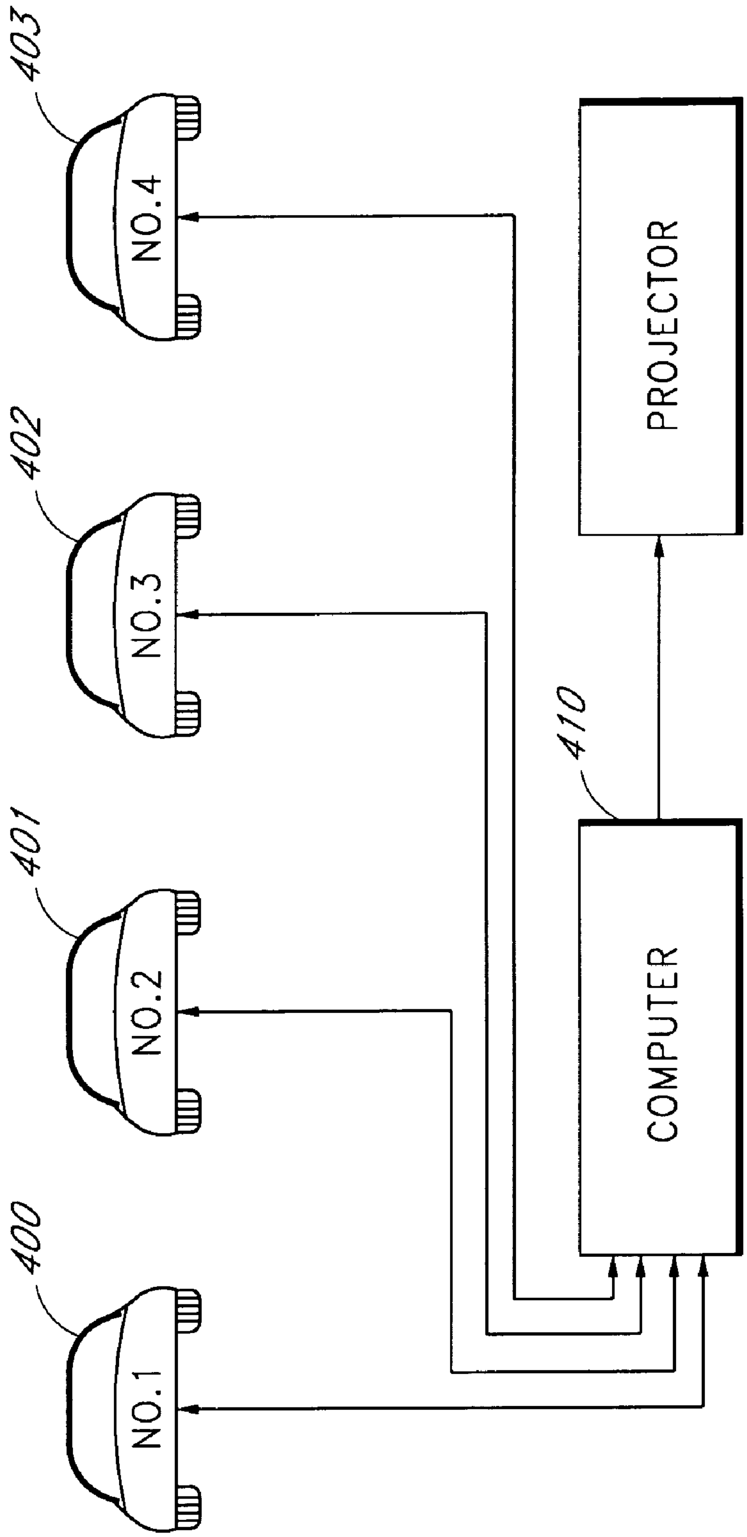
FIG. 9 is a block diagram showing several simulations connected together.

The virtual reality experience is further enhanced in the system shown in FIG. 9 where a number of race car simulators, each advantageously constructed as shown in FIGS. 2, 3 and 4 are located in the same or even different locations so that the participant drivers race against each other. Four race car simulators 400, 401, 402 and 403 are shown each connected to the computer 410. Projector 415 is connected to the output of the computer 410. Computer 410 is suitably programmed to accept input signals from all of the race simulator controls—steering wheel, foot pedals, etc. and continuously provide to each of the participants in each of the simulators 400, 401, 402 and 403, a virtual experience created by the interactions of each participant driver and thus a race that is different each time that it is experienced. Thus, for example, if Race Car No. 1 passes Race Car No. 2, this will be part of the action viewed by all of the participant drivers whereas in another race, at the very same time, Race Car No. 2 could pass Race Car No. 1.

Figure 10:
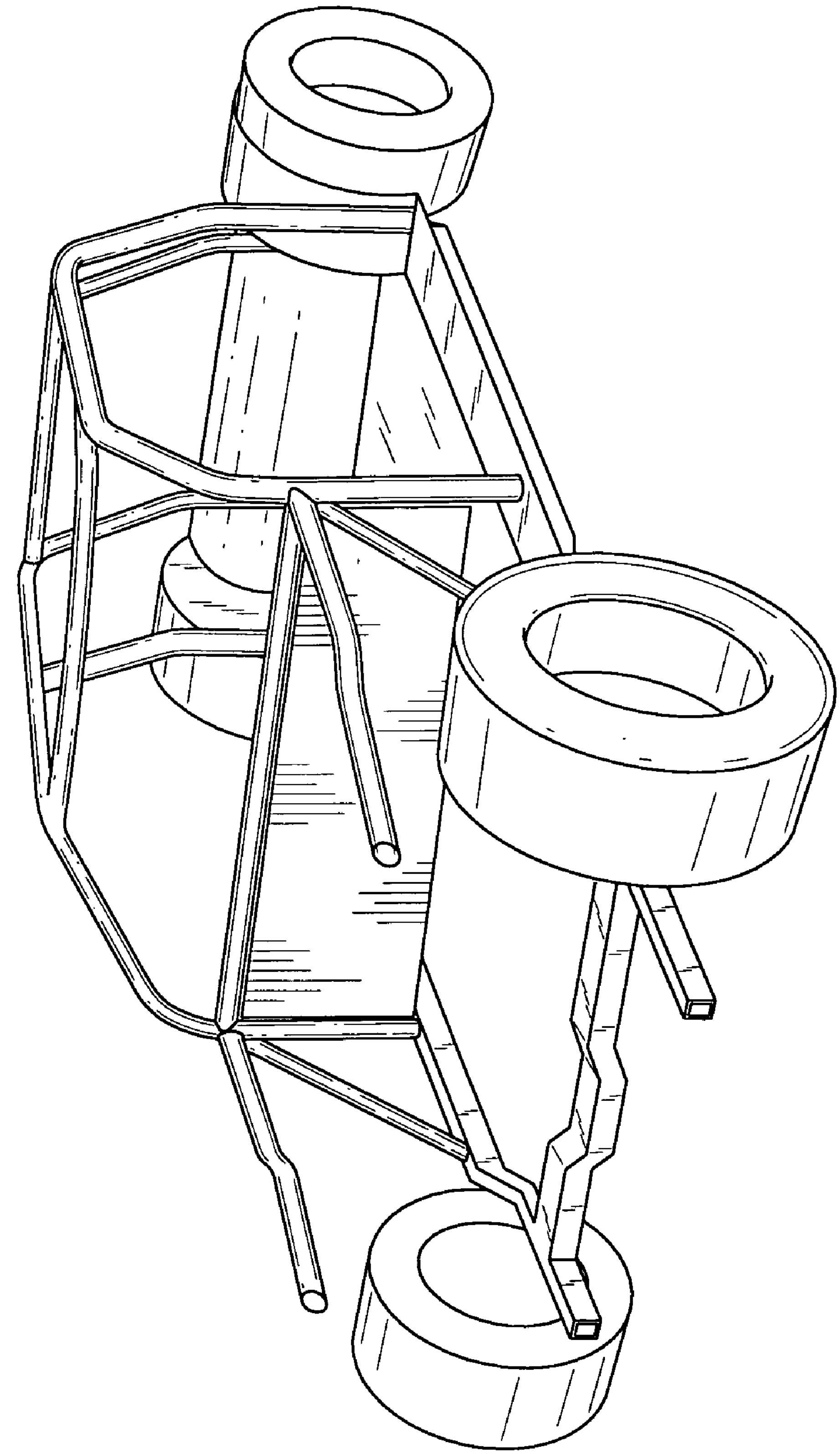
FIGS. 10, 11, and 12 are photographs of a race car simulator constructed in accordance with one embodiment of this invention.
Figure 11:
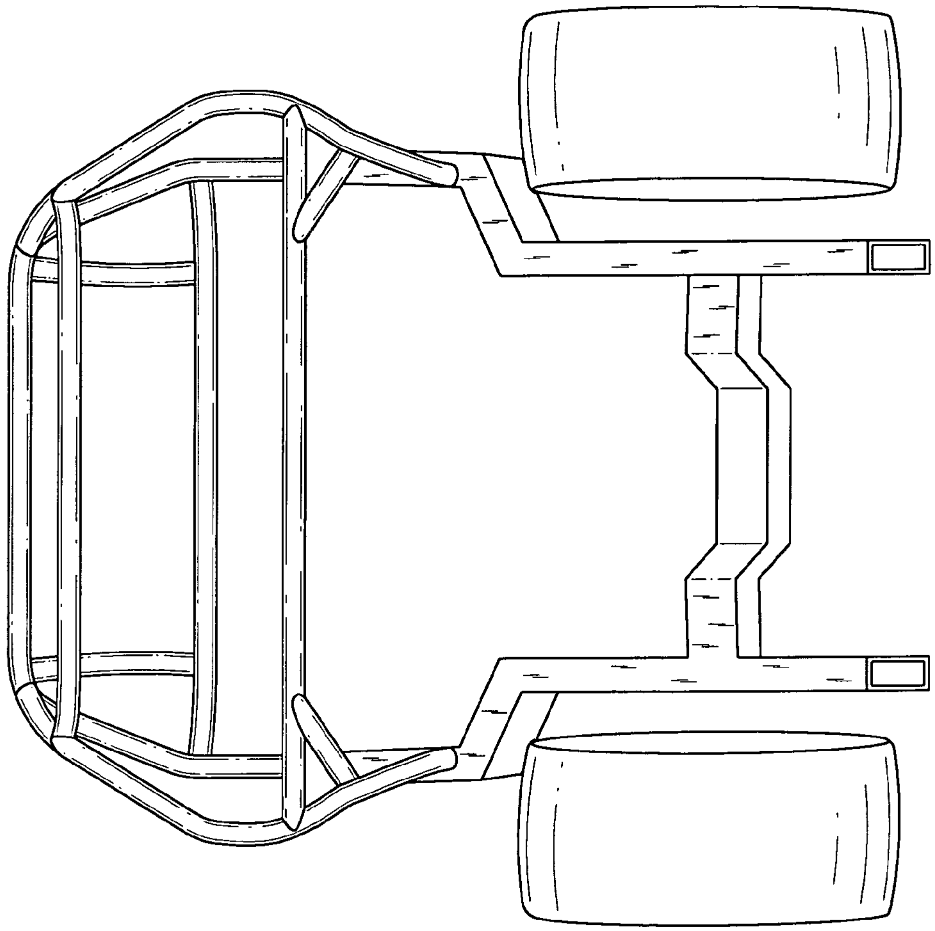
Figure 12:
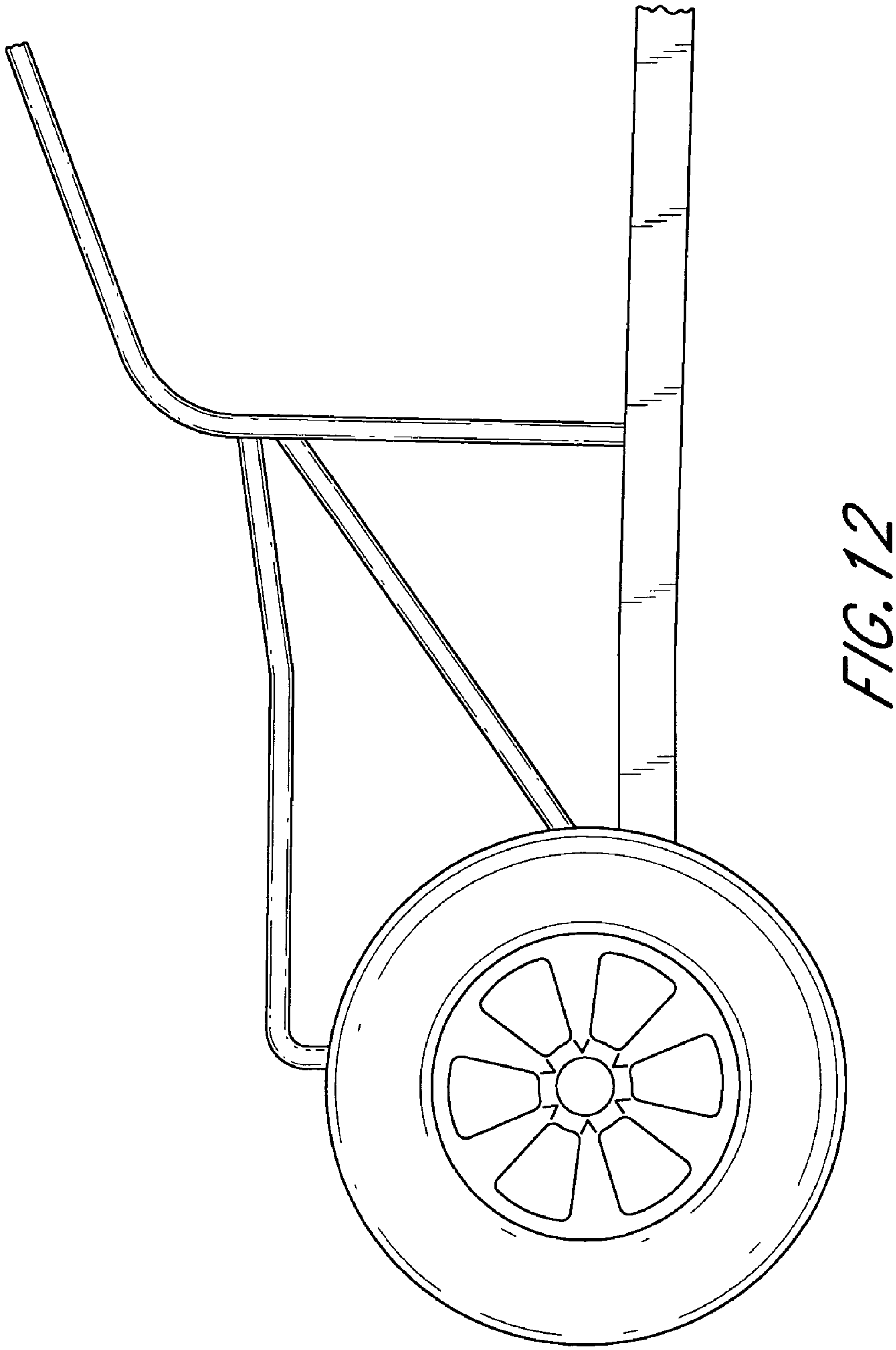
Figure 13:
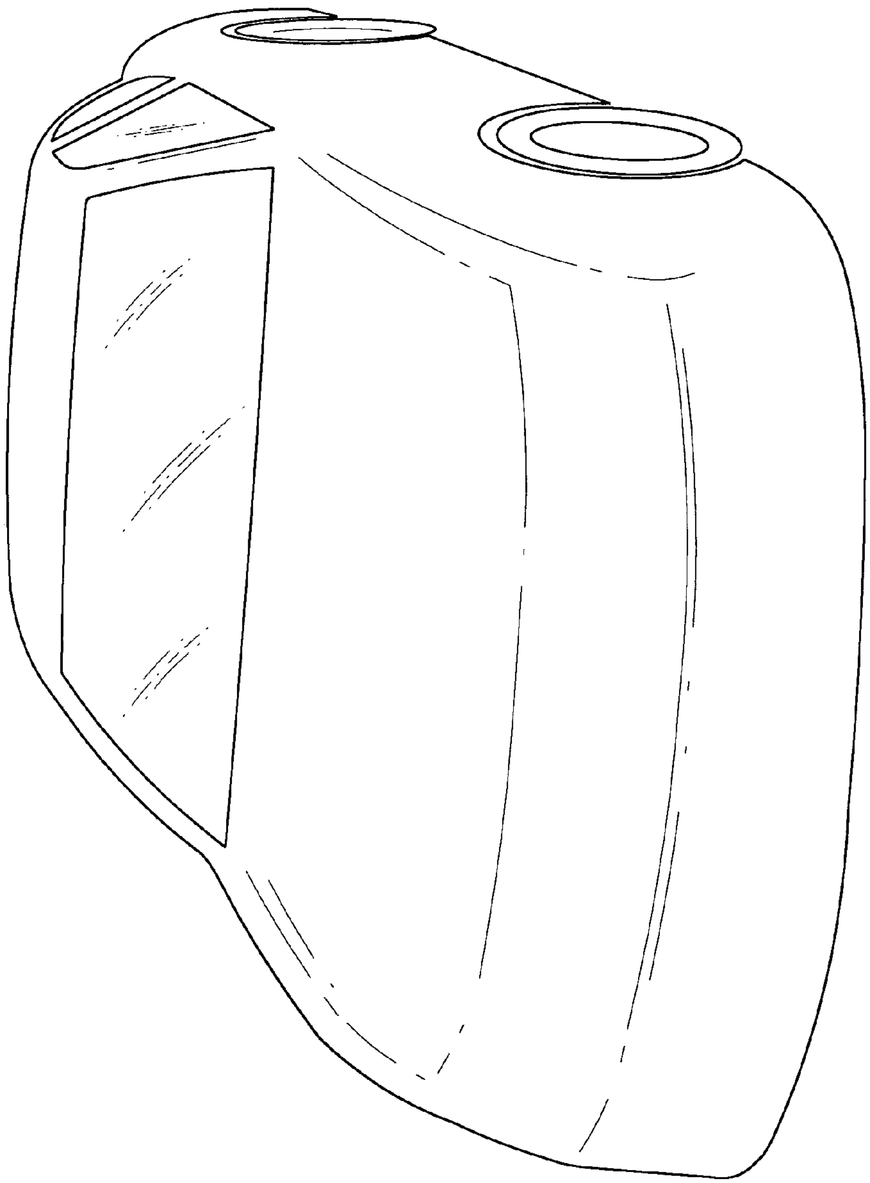
FIGS. 13, 14 and 15 are photographs of the exterior of a race car simulator constructed in accordance with one embodiment of this invention.
Figure 14:
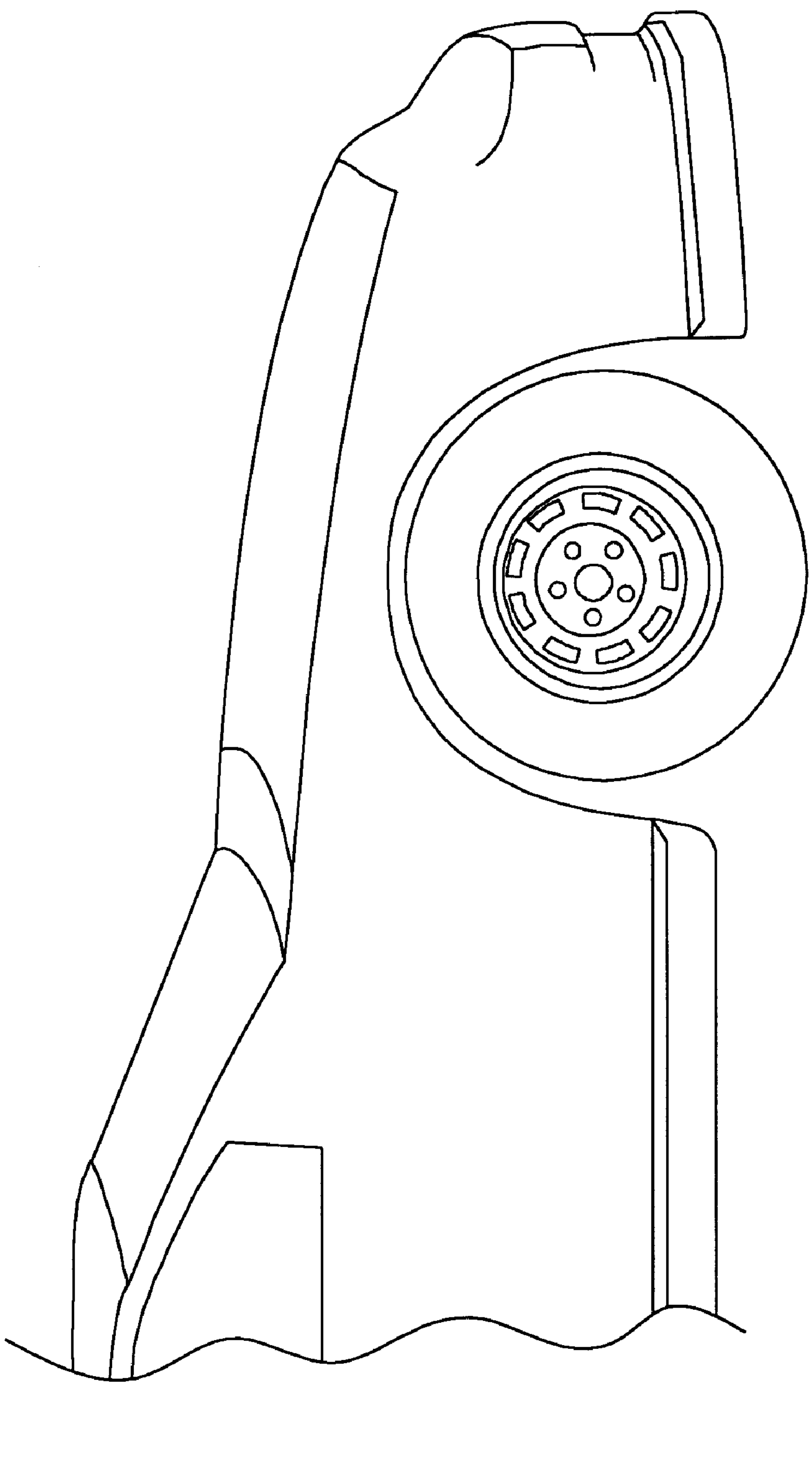
Figure 15:
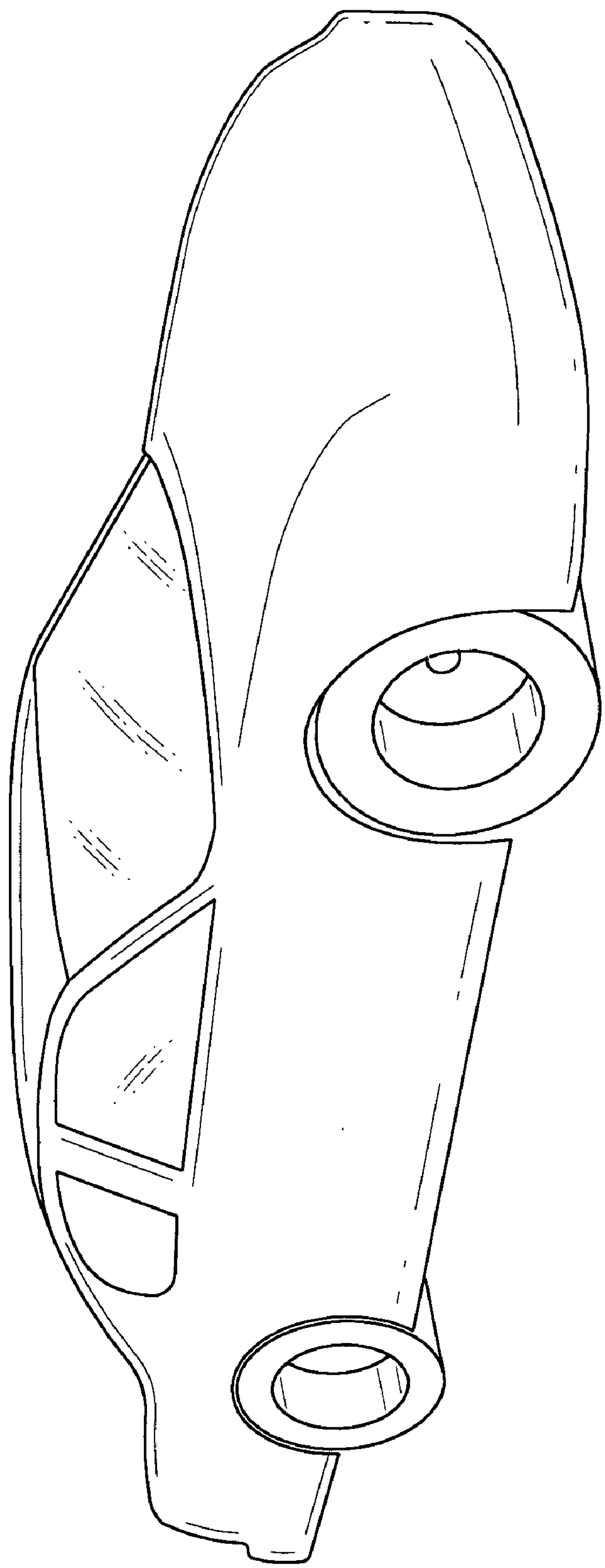

By way of specific example, the specifications for one embodiment of the virtual simulator race car constructed in accordance with the invention are as follows:

- Chassis: The chassis shown in FIGS. 10, 11 and 12 is made from welded mild steel tubes of various diameters and sizes with aluminum sheets bonded and riveted to the tubes.
- Body: The body shown in FIGS. 13, 14 and 15 is made of fiber-reinforced plastic with lexan windows. Body is painted to depict the current trend in NASCAR race cars.
- Cockpit (Interior): The cockpit is very close to or exactly like current tube frame race cars with appropriate controls and seating. The doors are advantageously functional and have composite interior panels to house audio speakers.
- Sound System: A quadraphonic stereo system with (2) woofers for low-frequency sound and (4) mid-range and (2) high-frequency tweeters.
- Computer System: A 400 MHz PENTIUM III dual processor with a 3D graphics card of at least 16 MHz.
- Controls: Steering wheel, throttle, clutch, brakes and shift lever, all with force feedback. Interactive instruments mounted in instrument panel.
- Optical System: Epson Power Lite 7300 projector interfaced with computer and controls system. (1) 8"×8" first mirror 11. (1) 18"×23" second mirror 12. Acrylic blow-formed spherical dome with a laminated 1.5 gain rear projection screen 15. Spherical mirror 70.

Figure 16:
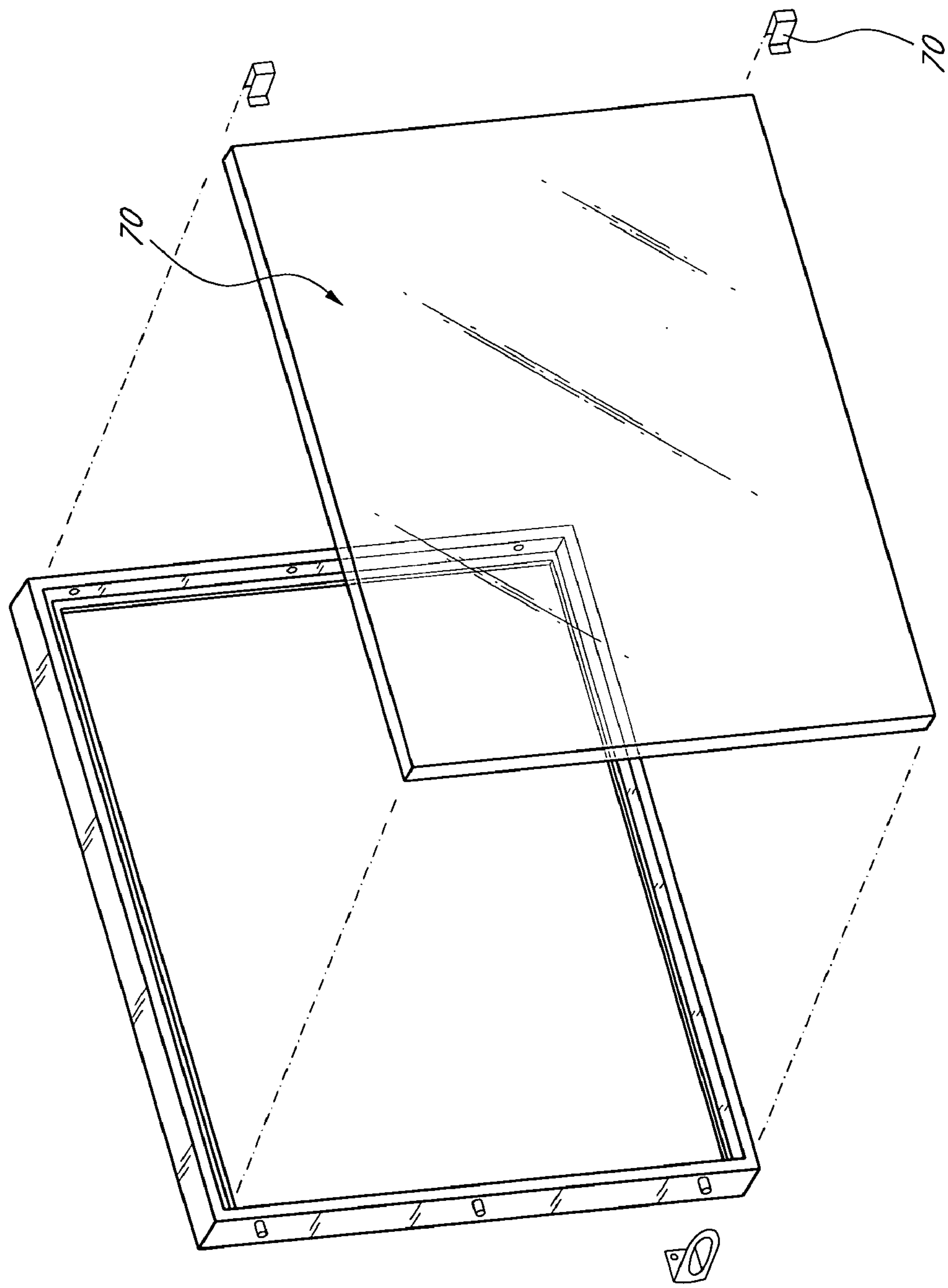
FIG. 16 is a drawing of a spherical mirror and associated frame of one embodiment of this invention.
Figure 17:
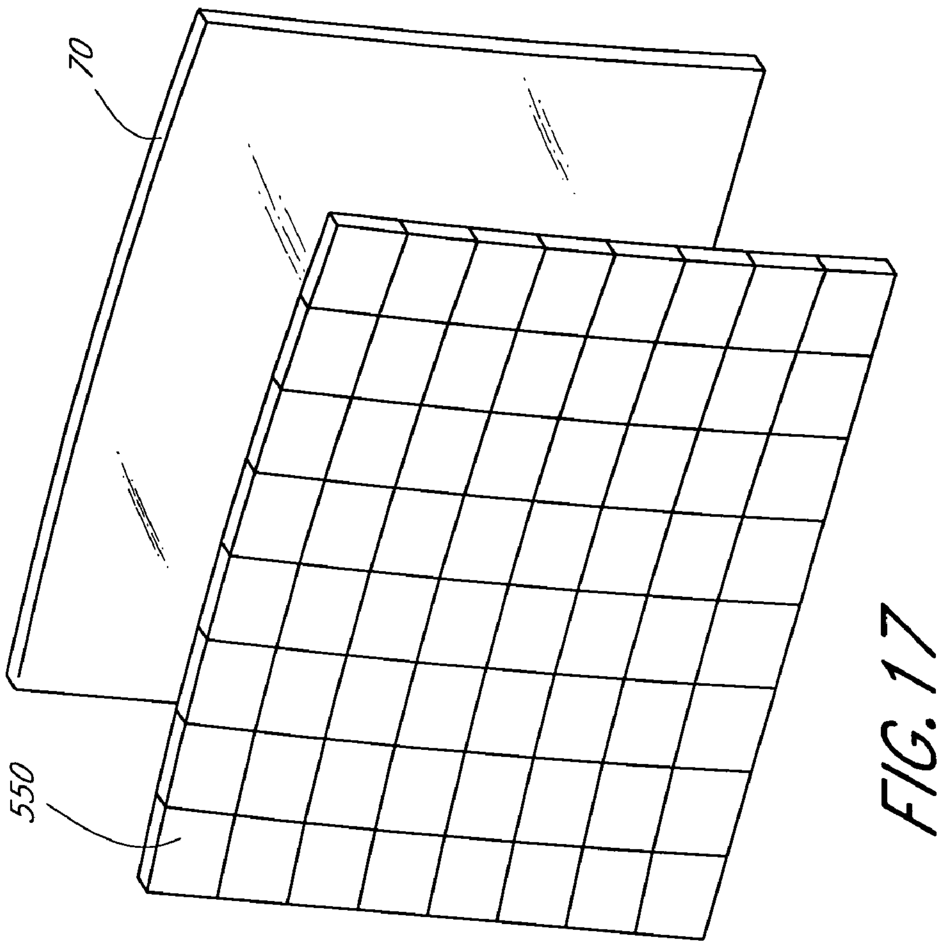
FIG. 17 illustrates the preferred structure and method for stiffening the spherical mirror.

The mirror 70 is shown in FIGS. 16 and 17. In an exemplary embodiment, mirror 70 is a 55"×69" blow-formed acrylic spherical dome which is vacuum-plated with a mirror surface such as metallic chrome and then coated with urethane.

The preferred structure and method of supporting this acrylic mirror is shown in FIG. 17. In one specific embodiment, a one inch thick sheet of urethane 550 is scored on X and Y axes 555, 560. These scores leave a series of slots on the side of the sheet opposite the mirror 70. In the specific embodiment, these slots are ⅛ inch thick and ⅞" deep. As a result, when sheet 550 is bonded to the back of mirror 70, the sheet 550 becomes contoured to the curvature of the mirror.

The preferred process of manufacturing the mirror 70 includes bonding the side of sheet 550 facing the back of mirror 70 before the acrylic mirror is removed from the mold form used to create its spherical shape. The scored side of sheet 550 is then bonded and laminated with layers of fiberglass cloth and resin. In the specific exemplary embodiment, six layers of 8 oz. fiberglass cloth are used with epoxy or polyester resin.

As a result, the molded shape of the mirror 70 is rigidly permanently supported to prevent flexure of the mirror and thus avoid any degradation of the image reflected by the mirror to the viewer 25*a*. This is a significant feature of this invention since even a minor flexing of the mirror 70 will cause a noticeable distortion of the image viewed by the player 25*a*.

In another embodiment shown in FIG. 16, the thin acrylic mirror is supported in a frame of steel or similar material.

The cockpit is designed advantageously for one or two users, also referred to as a player or passenger. Typically, the interactive computer system of the present invention is a simulation environment designed for multiple users with each user positioned in his own cockpit. The interactive computer system includes, but is not limited to, the computer, interactive program and related software, any network necessary to tie multiple user (if present) together. Multiples of the cockpit are typically then located at a particular site, but may also be located at remote sites. At the particular site, usually within a building, there is housed the cockpits, computers, programs, and network and support systems for the interactive computer systems.

As shown in FIGS. 10, 11 and 12, the cockpit is in a frame and housing for holding and securing the components within. The vehicle is comprised of three sections, the equipment section, passenger section and computer bay (trunk). Each of these sections has a frame.

The passenger section has a frame that provides its central support. The skin and the front bulkhead of the passenger section attached together and to each other to form the compartment that houses the passenger seating area and controls.

Enclosing of the cockpit by the frame and body, with the door closed, keeps the outside environment from impinging on the user's experience, permits the implementation of the dimensional sound, and allows for light control. Further, by making the interior of the frame to match, the user has no visual distractions when inside the cockpit other than those intended by the computer graphics of the simulation environment and the displays presented; with the door closed, the interior of the cockpit is dark. The material of the coverings and the door (not shown) is typically robust such as a vacuformed ABS plastic. Preferably, that material will be laminate of black layer for the interior of the cockpit.

To aid in maintaining a comfortable temperature within the cockpit, forced air ventilation is provided in the cockpit. For the ventilation, a ventilation fan is located under the instrument panel. The fan opening penetrates both the interior bulkheads. The ventilation fan provides for the air circulation from the exterior of the cockpit to its interior. This ventilation improves user comfort and reduces the opportunity for simulator sickness. The ventilation fan is further selected and operated for quiet operations so as to no adversely affect the audio presentation.

A sound system is provided to the user. Localization of sound sources is a preferred embodiment of the present invention. The quadraphonic sound system implemented is exemplary, but not restrictive, of the three-dimensional sound system of the invention. All of the speakers of the sound system are contained entirely within the vehicle cockpit and do not extend outside the cockpit that would increase the cockpit's reduced footprint. Speakers (not shown) are typically mounted inboard facing the driver or passenger. Sound is reflected from the source speakers (not shown), off the interior surfaces of skin coverings and the door (not shown) to the seated user. These acoustic reflections increase apparent separation of stereo image both in front of and behind passenger. This wider apparent separation in the front stereo image and especially the rear stereo image make the apparent spacing among the four speaker sets more equal, resulting in a superior quadraphonic 3D presentation.

The dimensional sound system is implemented with a group of balanced quadraphonic speakers. Off-the-shelf speakers are strategically located within internal space of the cockpit so as to deliver the most realistic sound possible. Woofers are located in woofer speaker openings. Two of the woofers are located in the bay behind the passenger seat in holes provided in the interior cover plates and extend in the space behind the interior cover plates. This central placement of the rear woofers is sufficient because the bass is largely non-directional.

For example, should it be necessary to cause the cockpit computer to load a new computer program, this operation would be accomplished by connecting a keyboard (not shown) within the computer bay. The monitor adjustment knobs provide for the tuning of the primary display monitor and the secondary display monitor. Vertical height, vertical position, horizontal width, horizontal position, brightness, contrast are exemplary of the adjustments.

Brightness, key-stoning and image quality are adjusted through the digital projector. The magnifying mirror located within the optics package is under the cover to the optics enclosure (hood) and is removable for aligning, servicing and cleaning the optics. It articulates up to seventy-five degrees (approximately) for optimal viewing and image control.

The magnifying mirror is a spherical section that increases the size and apparent distance to the image from the primary display. A key point of this invention is the position of the spherical mirror is concentric to the viewer and reduces the effect of ambient light.

The wide angle maximum field of view is approximately 30° vertically and 40° horizontally. This orientation of the display device that includes the primary display and the related optics—the mirror makes the seated user feel that he is looking out the windshield of a vehicle into the computer generated simulation environment. Further, the increase in the apparent distance to the image makes the image appear to be a life-sized environment.

The cockpit includes a leg area in which is located the foot pedals and leg room for the cockpit user. The leg area extends from the passenger section forward to the foot pedals within the lower portion of the cockpit just adjacent to the optics package.

When the user is ready to start his virtual reality experience, he locates the vehicle designated for him by the external labeling (graphics) on the outside of the vehicle.

Each user then climbs into his designated cockpit to begin. The user closes the door of the cockpit that depresses a door-closed switch (not shown), that triggers a sound effect and starts the program sequence. If there are any problems, the operator can override the starting sequence and stop or suspend the program. Once the door has closed and the program has started, windows located on the outside of the body covering allows an operator to view the inside of the cockpit without breaking into the interior space of the cockpit. In the event that the operator determines it is necessary to communicate with a user inside the cockpit without opening the door, the operator may use the intercom to plug in a headset (not shown) and talk with the user using the communication system provided.

What is claimed is:

1. A race car virtual reality simulator comprising:

a chassis constructed from welded steel tubes and shaped aluminum sheets;

a body of fiber-reinforced plastic;

a tube frame cockpit having a steering wheel, a floor board, and one or more seats;

a hood hinged at the front of said race car simulator;

first and second mirrors;

a computer projector mounted below or partially below the floor board of the cockpit, said projector mounted to project a computer display image onto said first mirror;

a rear projection screen;

said first mirror mounted to project the computer display image onto said second mirror and said second mirror mounted to project the computer display image onto the rear of said rear projection screen; and a third mirror mounted to the underside of said hood, said third mirror comprising a spherical mirror to provide the viewer with an enlarged life-like image of the rear projection screen when said hood is raised, said spherical mirror comprising a thin acrylic sheet molded to the desired curvature, a mirror surface on one side of said sheet, and a sheet of foam plastic scored on one side so that the foam plastic sheet conforms to the curvature of said molded acrylic mirror, said scored foam plastic sheet bonded to the back of said acrylic mirror;

said first and second mirrors rotatably attached to said chassis and rotatable from a first position where said hood is closed to a second position where said hood is raised.

2. A race car virtual reality simulator comprising:

a chassis constructed from welded steel tubes and shaped aluminum sheets;

a body of fiber-reinforced plastic;

a tube frame cockpit having a steering wheel, other automobile controls, and one or more seats;

a hood hinged at the front of said race car simulator;

first and second mirrors;

a computer projector mounted below or partially below the floor board of the cockpit, said projector mounted to project a computer display image onto said first mirror;

a rear projection screen;

said first mirror mounted to project the computer display image onto said second mirror and said second mirror mounted to project the computer display image onto the rear of said rear projection screen; and a third mirror mounted to the underside of said hood, said third mirror comprising a spherical mirror to provide the viewer with an enlarged life-like image of the rear projection screen when said hood is raised.

3. The apparatus recited in claim 2, further comprising a dimensional sound system.

4. The apparatus recited in claim 2, said cockpit comprising a covered frame housing, and located within said covered frame housing a dimensional sound system, an optics display system, and an interface for providing communication from the user to the interactive computer system.

5. The cockpit recited in claim 4, wherein said covered frame housing is totally enclosed in said vehicle.

6. The cockpit recited in claim 3, wherein the dimensional sound system is a quadraphonic sound balanced three-dimensional (3D) localization system.

7. The apparatus of claim 2, further a display system which comprises comprising a plurality of prearranged interactive displays.

8. The apparatus of claim 7, wherein the display system is an optics display system unaffected by ambient light.

* * * * *

UNITED STATES PATENT AND TRADEMARK OFFICE

CERTIFICATE OF CORRECTION

PATENT NO. : 7,021,937 B2
APPLICATION NO. : 09/835830
DATED : April 4, 2006
INVENTOR(S) : Barry Simpson et al.

It is certified that error appears in the above-identified patent and that said Letters Patent is hereby corrected as shown below:

At column 8, lines 32-33, in Claim 7, delete "further a display system which comprises comprising" and insert --further comprising a display system which comprises--, Signed and Sealed this Seventh Day of April, 2009

JOHN DOLL
*Acting Director of the United States Patent and Trademark Office*